(12) United States Patent
Straub et al.

(10) Patent No.: US 7,644,813 B2
(45) Date of Patent: Jan. 12, 2010

(54) FREEWHEEL COUPLING

(75) Inventors: Frank Straub, Hohenroth (DE); Frieder Altmann, Pommersfelden (DE)

(73) Assignee: Schaeffler KG, Herzogenaurach (DE)

( * ) Notice: Subject to any disclaimer, the term of this patent is extended or adjusted under 35 U.S.C. 154(b) by 474 days.

(21) Appl. No.: 11/537,684

(22) Filed: Oct. 2, 2006

(65) Prior Publication Data

US 2007/0074947 A1 Apr. 5, 2007

(30) Foreign Application Priority Data

Sep. 30, 2005 (DE) ................ 10 2005 046 896

(51) Int. Cl.
*F16D 41/07* (2006.01)
(52) U.S. Cl. ................... 192/45.1; 192/41 A; 188/82.8
(58) Field of Classification Search ............. 192/41 A; 188/82.8
See application file for complete search history.

(56) References Cited

U.S. PATENT DOCUMENTS

| 2,683,510 | A | * | 7/1954 | Troendly | ................... 192/45.1 |
| 4,854,435 | A | | 8/1989 | Kitamura et al. | |
| 5,469,949 | A | | 11/1995 | Leitz | |
| 7,389,864 | B2 | * | 6/2008 | Miura | ................... 192/45.1 |
| 2003/0006114 | A1 | * | 1/2003 | Miura et al. | ................ 192/45.1 |
| 2006/0090978 | A1 | * | 5/2006 | Straub et al. | ............... 192/41 A |

FOREIGN PATENT DOCUMENTS

| DE | 921 958 | 1/1955 |
| DE | 1 132 390 | 6/1962 |
| DE | 37 29 632 | 3/1989 |
| DE | 38 01 423 | 6/2001 |
| DE | 10310225 | 9/2004 |
| WO | WO2004/079220 | 9/2004 |

* cited by examiner

*Primary Examiner*—Richard M. Lorence
(74) *Attorney, Agent, or Firm*—Volpe and Koenig, P.C.

(57) ABSTRACT

A freewheel coupling (1) is provided having clamping bodies (4), which are arranged between an inner ring (2) and an outer ring (3) and which have a narrow section (5). A single cage (9) is arranged between the inner ring (2) and the outer ring (3) with a plurality of pockets (10). Each of the pockets (10) has an area (12) that is narrower in the axial direction and an area (11), which is adjacent to this narrower area, which is wider in the axial direction, and which is provided for holding a clamping body (4). A spring band (6), which is arranged radially within the cage (9), has an original curvature in the unloaded state, wherein the curvature radius exceeds a radius of the cage (9), and spring tongues (13), which are provided for spring mounting of the clamping bodies (4), are directed radially inwardly.

11 Claims, 5 Drawing Sheets

FREEWHEEL COUPLING

FIELD OF THE INVENTION

The invention relates to a freewheel coupling or overrunning clutch with reduced-size clamping bodies arranged between an inner ring and an outer ring.

BACKGROUND OF THE INVENTION

A freewheel coupling of the above-noted type is known, for example, from DE 103 10 225 A1. This freewheel has clamping bodies, which can be tilted to a limited degree in a cage, with a positive-fit stop for the clamping bodies, as well as for a spring tongue contacting the clamping bodies on one boundary wall of the cage, being provided when the clamping body is tilted in the direction towards the raised, non-clamping position. The spring tongue has either a so-called bending geometry (see FIG. 1, FIG. 5) or extends in the tangential direction of the freewheel without a bending geometry (see FIG. 6). While the former embodiment requires a relatively high production-related expense, for the latter embodiment, higher forces can appear in the spring in the tangential direction.

SUMMARY

The invention is based on the objective of providing a clamping body freewheel, which distinguishes itself both through economical production possibilities and also through especially favorable operating properties.

This objective is solved according to the invention. Clamping bodies with a sectionally reduced size are located in pockets of a cage arranged between an inner ring and an outer ring of the freewheel and a spring force acts on these clamping bodies. In this context, the "inner ring" is understood to be, in general, any rotationally symmetric part, whose outer surface forms a contact surface for the clamping bodies. In particular, a solid shaft is also subsumed under the term "inner ring." The spring force acting on the clamping bodies and pressing these in the direction of their clamping position is provided by a spring band, which is arranged radially within the single cage of the freewheel coupling. Individual spring tongues of the spring band each contact a clamping body and in this way project into a pocket of the cage, in which the clamping body is arranged. The pockets in the cage essentially have a T-shape with a wider area in the axial direction of the freewheel coupling and a narrower area adjacent to the wider area, with the wider area being adapted to the clamping body shape and the narrower area guaranteeing a sufficient freedom of movement of the spring tongue.

The entire spring band is pretensioned relative to the cage. As long as absolutely no force acts on the spring band, it has an original curvature with a curvature radius that exceeds the radius of the cage. Also, in the unloaded state of the spring band, the spring tongues are already curved, with its curvature, however, having a radius that is at least somewhat smaller than the curvature radius of the spring band overall, so that the spring tongues are directed at least slightly inwards. Through the inwards bent shape of the spring tongues, it is guaranteed that the spring tongues of the spring band, even when it is inserted in a cage, do not point outwards, but instead are directed to a slight degree in the direction towards the axis of the freewheel coupling—without providing clamping bodies. In the freewheel equipped with clamping bodies, the spring tongues are always pretensioned for clamping at the beginning. For an increasing torque transfer between the inner and outer rings, thus, for an increasing clamping effect, the spring tongue moves radially inwards. Here, the spring tongue goes through the zero position during the tilting motion of the clamping body, that is, the position, in which it is aligned tangentially.

The bent shape of the spring tongues in the described way significantly contributes to the prevention or reduction of peak stress loads during the tilting of the clamping body. Such peak stress loads can occur in the spring band for freewheel couplings according to the state of the art especially when the spring tongue is bent in one piece with the spring band and the clamping body is held in the spring band with play. The freewheel coupling according to the invention provides help in terms of the mechanical peak stress loads in the spring band, without requiring springs with complicated shapes. Preferably, the entire spring band, including the spring tongues, has only a single curvature direction.

The compactly shaped spring tongue with low inertia requires no stop on the cage. In the preferred configuration, the spring tongue can move freely within the narrower area of the outer ring pocket. The spring tongue formed on a transverse crosspiece of the spring band is essentially rigid. The spring effect is achieved mainly through torsion of the transverse crosspiece extending in the axial direction of the freewheel coupling. For a tilting movement of the clamping body, not only is the spring tongue extended, but also any transverse crosspiece, which contacts the clamping body on its side facing away from the spring tongue, is also tilted somewhat. This torsion of the transverse crosspiece also contributes to the desired spring action of the clamping body.

While the extension of the spring tongue is not restricted by the cage, in an advantageous way the cage for the clamping body forms a contact surface, which is used as a stop for the cage in the freewheel position, especially in the position lifted from the inner ring. The stop, which is adapted to the contours of the clamping body, is preferably located at the transition between the wider and the narrower areas of the cage pocket holding the clamping body.

The clamping body contacting the cage can introduce forces radially into the outer ring via the cage. A stable contact of the clamping body on the cage is given when a contact point of the clamping body is arranged on the inner ring in the peripheral direction between the stop surface on the cage and a contact point of the clamping body on the outer ring.

According to one advantageous refinement, sliding disks are placed on the cage at the cage ends. The sliding disks preferably made from a nonferrous heavy metal or coated with a nonferrous heavy metal and are connected so that they rotate with the cage. Furthermore, a radial bearing function can be realized by a roller bearing arranged axially next to the clamping bodies.

The cage of the freewheel coupling is preferably made from plastic. In an especially advantageous configuration, a fiber-reinforced plastic, especially a glass fiber-reinforced plastic, is used for the production of the cage. In this way, a temperature resistance up to approximately 200° and also good resistance to oils common in the automotive field can be achieved.

As long as no radial loads act on the cage, it is preferably guided inwards, namely onto the spring band. Alternatively, an outer guide of the cage is also possible. The ends of the spring band are preferably arranged overlapping radially within the single cage of the freewheel coupling without a connection. Because each clamping body is mounted in a cage pocket so that it can move, in a preferred configuration, there is, as a whole, a floating support of the cage on the spring band. This means that at least slight movements between the spring band and the cage are possible in the tangential direction. Likewise, the radial position of the cage is not completely fixed relative to the spring band. The radial position of the spring band results essentially from the position of the diameter reduction of the clamping body. As long as a clamping body is not pressed in the freewheel position in the direction towards the outer ring, the outer wall of the cage remains at least slightly at a distance from the outer ring. Thus, different thermal expansion coefficients of the cage produced from a polymer material on one side and the metallic inner and outer rings on the other side can be tolerated.

BRIEF DESCRIPTION OF THE DRAWINGS

Below, several embodiments of the invention are explained in more detail with reference to a drawing. Shown here are.

DETAILED DESCRIPTION OF THE PREFERRED EMBODIMENTS

Figure 1A:
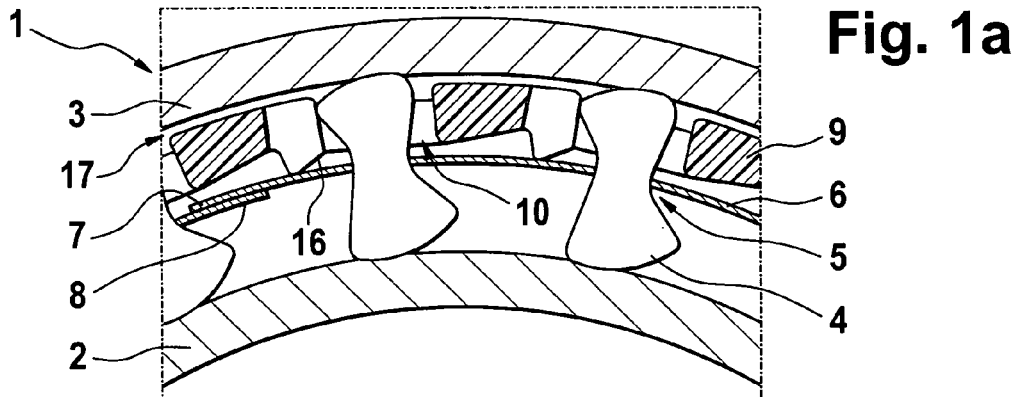
FIG. 1a to 1d are cross-sectional views showing different operating states of a clamping body freewheel.

FIGS. 1a to 1d show, in section, simplified cross-sectional illustrations of a freewheel coupling 1, also designated as a clamping body freewheel, in different states of conventional operation. The freewheel coupling 1 is used, for example, in a torque converter or in an automatic transmission of a motor vehicle. In the torque converter, the freewheel coupling 1 can guarantee a freewheel function for the guide wheel arranged between the pump wheel and the turbine wheel.

The essential components of the freewheel coupling 1 are an inner ring 2 and an outer ring 3, between which several clamping bodies 4 are arranged. The clamping bodies 4 have a reduced-size shape with a narrow section 5, with these narrow sections 5 determining the position of a spring band 6 arranged essentially concentrically to the inner ring 2 and outer ring 3. The spring ends 7, 8 not connected to each other overlap, as follows from FIG. 1a. Radially between the spring band 6 and the outer ring 3 there is a cage 9 made from plastic and guided on the spring band 6 or on the outer ring 3. Each clamping body 4 is located in a recess 10, also designated as a pocket, of the cage 9.

Figure 2:
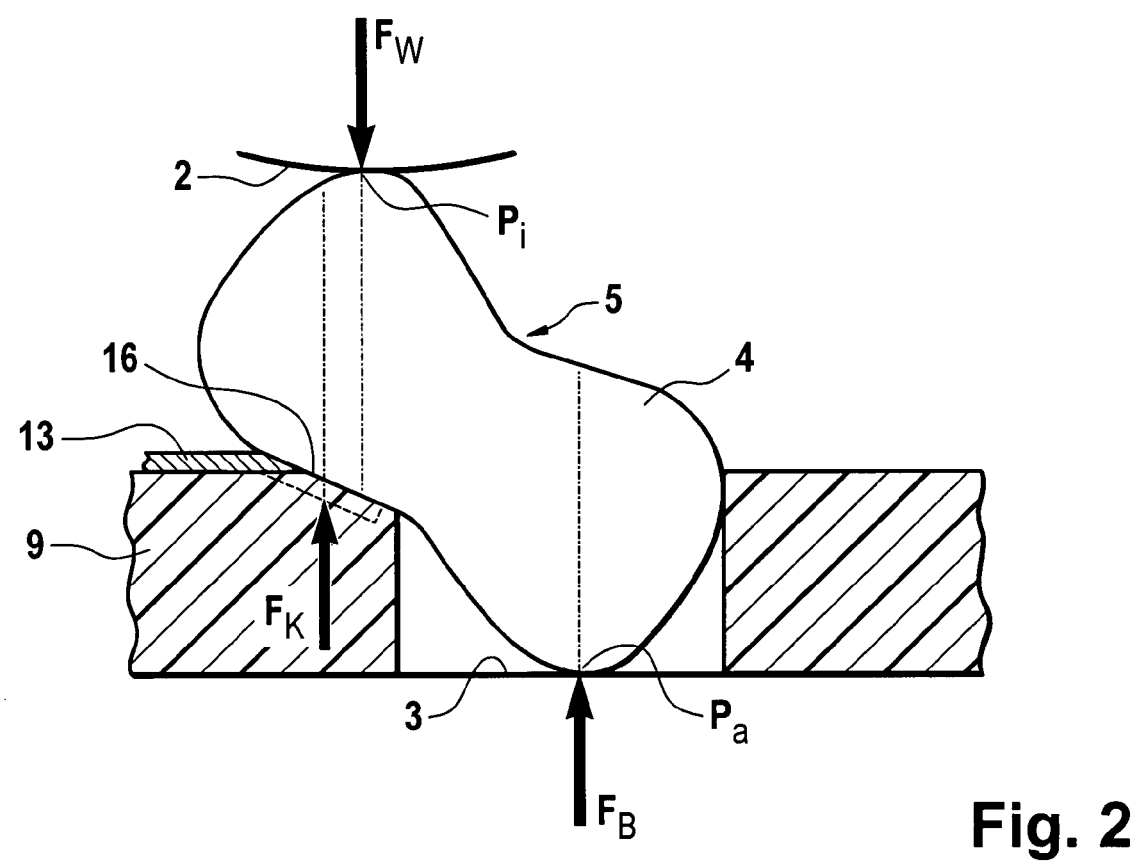
FIG. 2 is an enlarged detail view of a clamping body in a freewheel coupling.
Figure 3A:
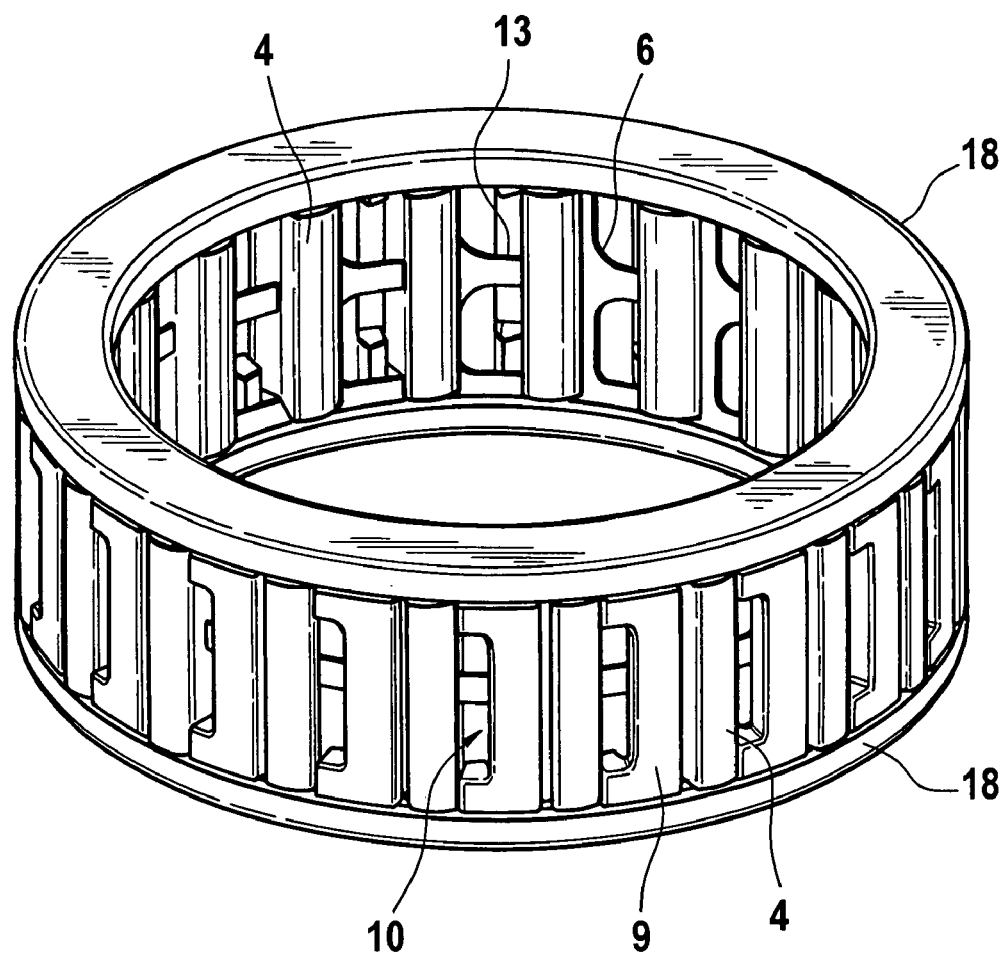
FIGS. 3a and 3b are a perspective view and exploded perspective view, respectively, of another embodiment of a clamping body freewheel coupling.
Figure 3B:
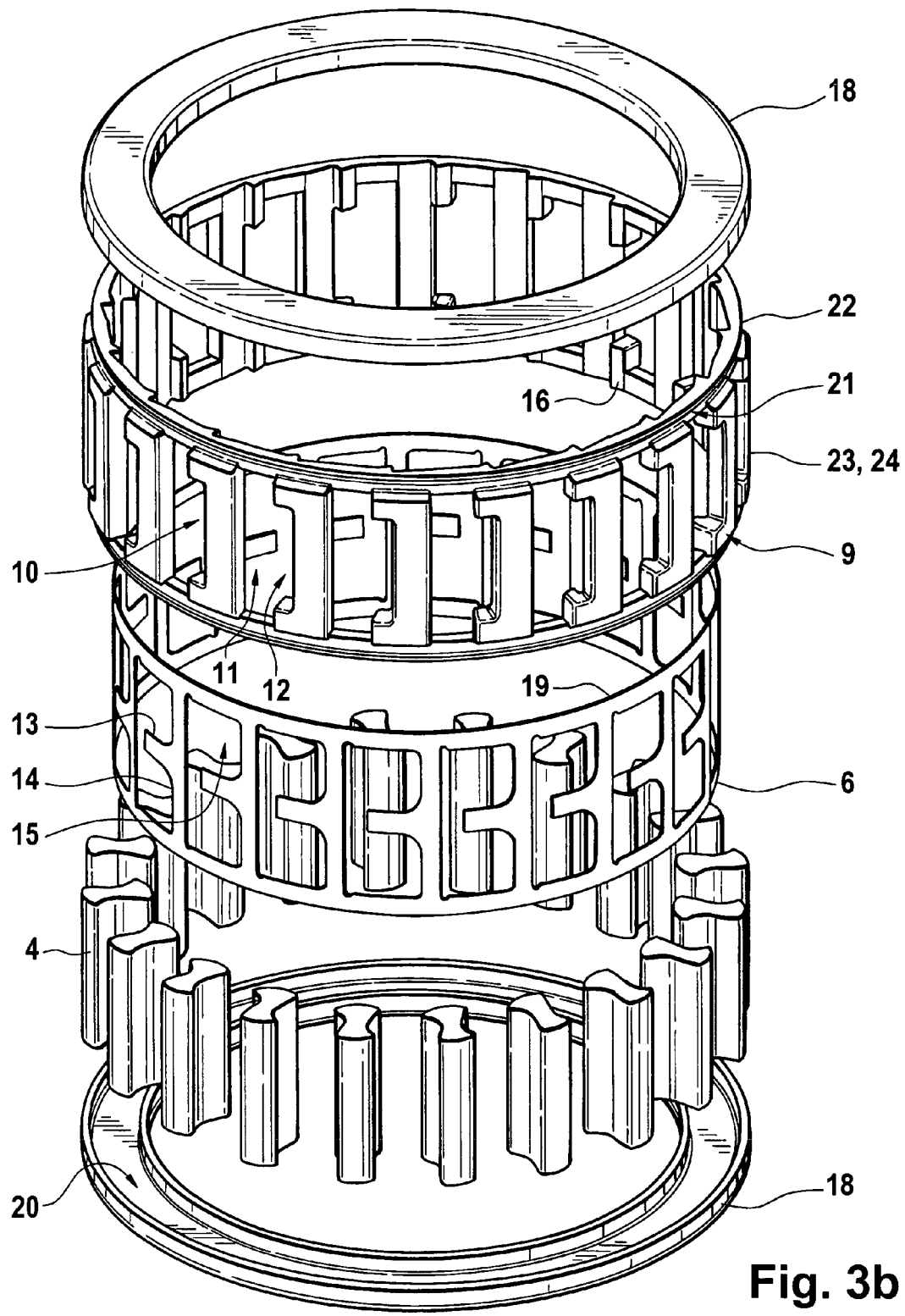

The shape of the pockets 10 is easily visible with reference to FIG. 3b, which shows, in an exploded view, a freewheel coupling 1, whose setup and function corresponds essentially to that of the embodiment from FIGS. 1a to 1d. The following statements relate to all of the configurations from FIGS. 1a to 1d, 2, 3a, 3b, 4 if not explicitly stated otherwise.

The pockets 10 of the cage 9 have a very flat T-shape with a wider area 11 in the axial direction of the freewheel coupling 1 and a narrower area 12 directly adjacent to the wider area. While the wider area 11 is used for the holder of a clamping body 4, a spring tongue 13 contacting the clamping body 4 is arranged in the narrower area 12. Each spring tongue 13 is formed on a transverse crosspiece 14 of the spring band 6 extending in the axial direction of the freewheel coupling 1. The free area between two adjacent transverse crosspieces 14 of the spring band 6 corresponds in size and shape approximately to pocket 10 of the cage 9. The rectangular open spaces between the transverse crosspieces 14 of the spring band 6, apart from the spring tongues 13, are generally designated as the punched out section 15. This designation is selected independent of the production method of the spring band 6, for example, processing by means of lasers is also possible and included under this term. The transverse crosspieces 14 connect surrounding rims 19 of the spring band 6. The entire spring band 6 has absolutely no beads, notches, or the like and thus can be produced very economically with reproducible quality.

The narrower area 12 of the pocket 10 fulfills a double function: first, it allows an unimpaired movement of the spring tongue 13, second, it is limited in the axial direction by contact surfaces 16 of the cage 9. These contact surfaces 16 defining the border between the narrower area 12 and the wider area 11 of the pocket 10 and also provide contact bevels that are adapted to form a positive fit with the clamping body 4, as follows in detail from FIG. 2.

In FIG. 2, several force vectors are drawn, which are applied on the clamping body 4; a force $F_W$ of the inner ring 2 loads the clamping body 4 outwards in the radial direction. Counter forces directed radially inwardly are applied in the form of a force $F_K$, with which the cage 9 acts on the clamping body 4, like a force $F_B$, with which the outer ring 3 loads the clamping body 4 inwards. The contact points of the clamping body 4 on the inner ring 2 and also on the outer ring 3 are designated with $P_i$ or $P_a$. As is visible from FIG. 2, the force vectors $F_K$ and $F_B$ are spaced apart in opposite circumferential directions from the force $F_W$, so that as a whole a stable bearing of the clamping body 4 is produced. If a force, like that corresponding to real conditions, is introduced into the clamping body 4 over an area from the cage 9, then the force vector $F_K$ designates the force that produces the same effects as the force introduced over such area. Radial forces acting between the inner ring 2 and the outer ring 3 can thus be transferred via the clamping body 4 and also via the cage 9, which has the contact bevel 16 for this purpose.

If the clamping body 4 is not supported by the cage 9 on the outer ring 3, then a gap 17 visible, for example, in FIG. 1a remains between the cage 9 and the outer ring 3. Thus the cage 9 is not guided outwards. An additional function of the cage 9 is given, such that a sliding disk 18 with a bead 20 can be snapped onto the end side of this cage, with this disk generating a sliding bearing between the inner ring 2 and the outer ring 3. On the cage 9, the sliding disk 18 surrounds an annular rim 22, which has a groove 21 and which is connected to crosspieces 23 of the cage 9 in the axial direction. The crosspieces 23 are somewhat raised in the radial direction relative to the rims 22 and thus form a cage projection 24.

Figure 4:
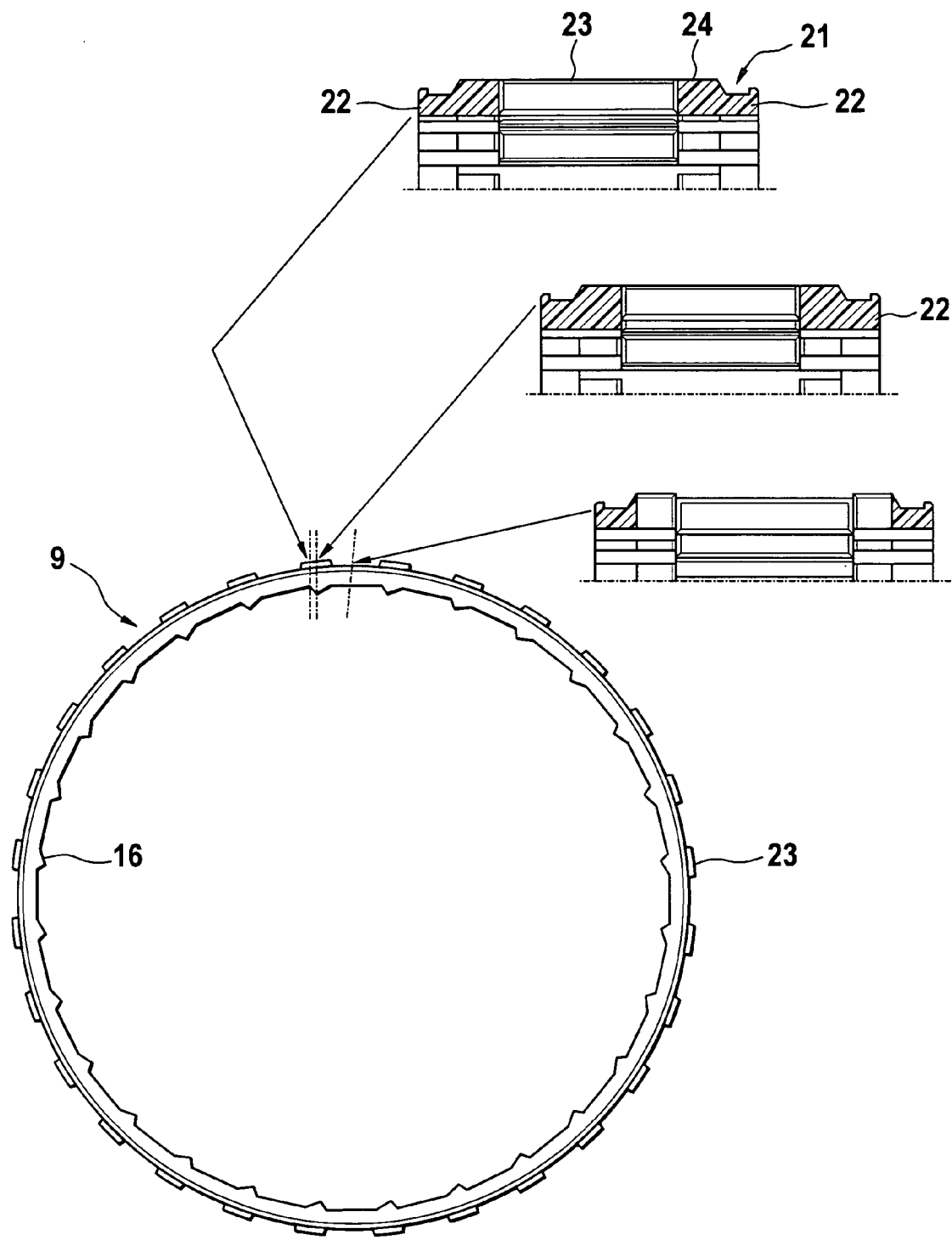
FIG. 4 is a top view and three cross-sectional views of a cage of the freewheel coupling according to FIGS. 3a and 3b.

As follows especially from FIG. 4, the rims 22, together with the crosspiece 23, describe a flat U-shape in cross section, with the rims 22, which extend somewhat farther than the crosspiece 23 in the radial direction and which represent radially inwardly directed legs of the U-cross section. The U-shaped configuration of the cage 9, on one hand, allows the guidance of the spring band 6 and, on the other hand, guarantees the free movement of the spring tongues 13. In the production of the cage 9 using a plastic injection-molding method, care must be taken that no deformation of the injection-molding die is possible radially inwardly.

Figure 1B:
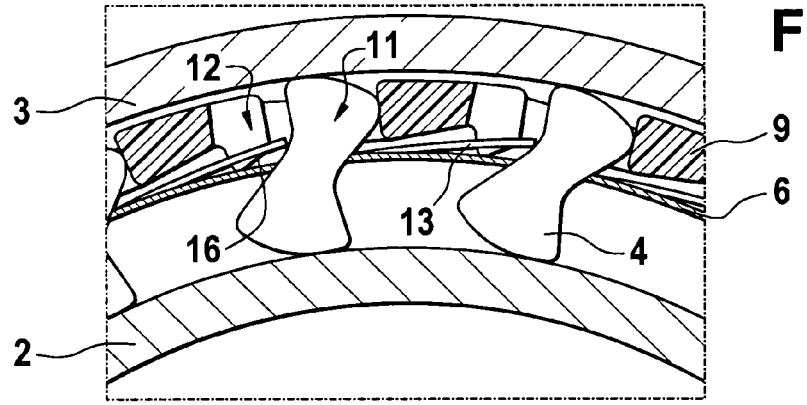
Figure 1C:
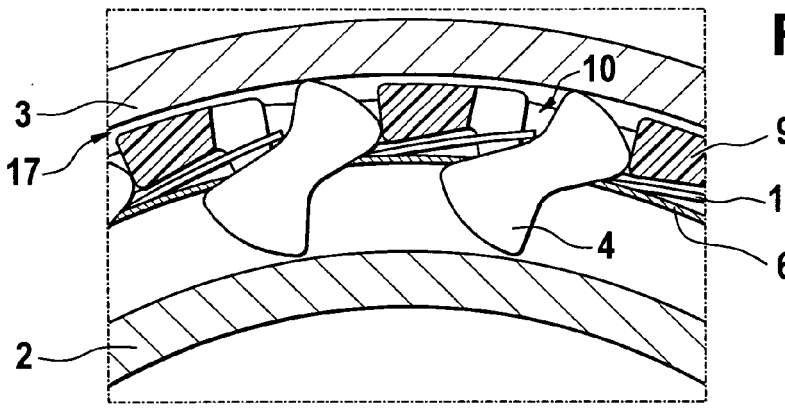
Figure 1D:
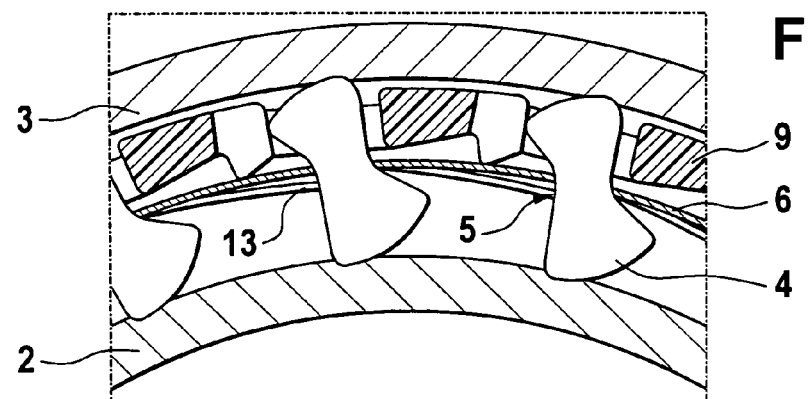

In the arrangement according to FIG. 1a to 1d, the outer ring 3 is entrained by the inner ring 2 when the inner ring 2 rotates in the clockwise direction. This state is shown in FIGS. 1a and 1d, with a relatively small torque being transferred in the position of the clamping body 4 according to FIG. 1a and the maximum torque being transferred in the arrangement according to FIG. 1d. In each of the movement states according to FIGS. 1a to 1d, the spring band 6 is pretensioned against the cage 9. If the spring band 6 is removed from the cage 9, then the spring band 6 expands somewhat, i.e., the curvature of the spring band 6 in the mechanically unloaded state has a greater radius than the cage 9. The curvature of the spring band 6 in the mechanically unloaded state is also designated as tumbled. With the spring band 6, the spring tongues 13 are also tumbled, wherein, however, there are differences in terms of the curvature radius of the spring band 6 as a whole and also for the individual spring tongues 13: without the effect of external forces, the spring tongues 13 are more strongly curved than the spring band 6 overall. Thus, the spring tongues 13 are directed radially at least slightly inwards within the spring band 6.

The arrangement of the spring tongues 13 in the mechanically unloaded state relative to the other spring band 6 thus corresponds, in principle, to the arrangement shown in FIG. 1d. Because the operating state according to FIG. 1d involves the transfer of the maximum possible torque between the inner ring 2 and the outer ring 3, that is, in comparison with the forces that the spring tongues 13 can apply, very high loads act on the clamping bodies 4, in this case it does not matter in which direction the spring tongues 13 act. In particular, it is acceptable when the spring tongues 13 exert only an extremely small force on the clamping bodies 4 in the direction towards the—already reached—clamping position.

Another situation is given when the clamping bodies 4, as shown in FIG. 1a, transfer only a relatively low torque between the inner ring 2 and the outer ring 3. In this case, the spring tongues 13 have the same tangential orientation as the entire spring band 6, so that they cannot be seen in FIG. 1a. If the entire spring band 6, including the spring tongues 13, were to have a constant curvature in the mechanically unloaded state, then in the arrangement according to FIG. 1a, the spring tongues 13 would exert no force on the clamping bodies 4 supporting the additional transition of the clamping bodies 4 into the clamping position. However, in contrast to the arrangement according to FIG. 1d, even in the arrangement according to FIG. 1a it is especially important for low torsional loading of the freewheel coupling 1 to support the transition of the clamping bodies 4 into the clamping position through a spring force. This is achieved in that the spring tongues 13 in the unloaded state are more tightly rolled than the remaining parts of the spring band 6. The spring tongues 13 have a uniform curvature direction, which coincides with the curvature direction of the entire spring band 6.

The arrangements according to FIGS. 1b and 1c differ from each other in that according to FIG. 1b, the clamping bodies 4 contact both the inner ring 2 and also the outer ring 3, while according to FIG. 1c, they contact exclusively the outer ring 3. In the case of FIG. 1b, a rotation of the outer ring 3 with low angular velocity and/or a rotation of the inner ring 2 with arbitrary angular velocity is provided, while in the case of FIG. 1c, the outer ring 3 rotates with high angular velocity. Therefore, centrifugal forces, which act on the clamping bodies 4 and which lead to the lifting of the clamping bodies 4 from the inner ring 2 and to the contact of these bodies on the contact bevels 16, are generated. If the angular velocity of the outer ring 3 is increased further, then the gap 17 still open in FIG. 1c can be closed by the generated forces. The increased friction between the cage 9 and the outer ring 3 promotes in a desired way the rotation of the cage 9 with the outer ring 3.

LIST OF REFERENCE SYMBOLS

1 Freewheel coupling
2 Inner ring
3 Outer ring
4 Clamping body
5 Narrow section
6 Spring band
7 Spring end
8 Spring end
9 Cage
10 Pocket
11 Wider area
12 Narrower area
13 Spring tongue
14 Transverse crosspiece
15 Punched-out section
16 Contact surface
17 Gap
18 Sliding disk
19 Rim
20 Bead
21 Groove
22 Rim
23 Crosspiece
24 Cage projection
$F_B$ Force
$F_K$ Force
$F_W$ Force
$P_i$ Contact point
$P_a$ Contact point

The invention claimed is:

1. Freewheel coupling, comprising
clamping bodies, which are arranged between an inner ring and an outer ring and which have a narrow section,
a single cage arranged between the inner ring and the outer ring with a plurality of pockets, wherein each of the pockets has an area that is narrower in an axial direction and an area, which is adjacent to the narrower area, which is wider in an axial direction, and which is provided for holding a respective one of the clamping bodies,
a spring band, which is arranged radially within the cage, has an original curvature in an unloaded state, that prior to installation within the cage has a radius that exceeds an inner radius of the cage and spring tongues provided for spring mounting of the clamping bodies are directed radially inwardly, and
the entire spring band, including the spring tongues, is formed with only a single inwardly directed curvature direction.

2. Freewheel coupling according to claim 1, wherein each of the spring tongues projects in the narrower area of a respective one of the pockets and here applies a force to the respective one of the clamping bodies in a direction of its clamping position.

3. Freewheel coupling according to claim 1, wherein the cage has positive-fit contact surfaces arranged at a boundary between the wider area and the narrower area of the pocket for the clamping body.

4. Freewheel coupling according to claim 3, wherein a contact point of the clamping body is arranged on the inner ring (2) in a circumferential direction between the contact surface on the cage and a contact point of the clamping body on the outer ring.

5. Freewheel coupling according to claim 1, wherein a sliding disk, which is mounted on the cage, is used for a sliding bearing between the inner ring and the outer ring.

6. Freewheel coupling according to claim 5, wherein the sliding disk is rotatably connected to the cage.

7. Freewheel coupling according to claim 1, wherein the cage is made from plastic.

8. Freewheel coupling according to claim 7, wherein the plastic of the cage is fiber reinforced.

9. Freewheel coupling according to claim 1, wherein the cage is mounted on the spring band without contact with the outer ring, at least in the absence of a radial loading between the inner ring and the outer ring.

10. Freewheel coupling according to claim 1, wherein the cage has rims that include radially inwardly directed legs that form contact surfaces for the clamping bodies.

11. Freewheel coupling according to claim 1, wherein the spring tongues, in an unloaded state, are more tightly rolled than remaining parts of the spring band.

* * * * *